(12) United States Patent
Mohamadi

(10) Patent No.: US 9,547,075 B2
(45) Date of Patent: Jan. 17, 2017

(54) ROBOTIC SENSE-THROUGH-WALL SENSOR WITH SIMPLIFIED CONTROL INTERFACE

(71) Applicant: Farrokh Mohamadi, Irvine, CA (US)

(72) Inventor: Farrokh Mohamadi, Irvine, CA (US)

( * ) Notice: Subject to any disclaimer, the term of this patent is extended or adjusted under 35 U.S.C. 154(b) by 224 days.

(21) Appl. No.: 14/465,738

(22) Filed: Aug. 21, 2014

(65) Prior Publication Data

US 2015/0054671 A1   Feb. 26, 2015

Related U.S. Application Data

(60) Provisional application No. 61/868,512, filed on Aug. 21, 2013.

(51) Int. Cl.
*G01S 13/02* (2006.01)
*G01S 13/56* (2006.01)
*G01S 13/88* (2006.01)

(52) U.S. Cl.
CPC ............ *G01S 13/0209* (2013.01); *G01S 13/56* (2013.01); *G01S 13/888* (2013.01)

(58) Field of Classification Search
CPC ..... G01S 13/0209; G01S 13/56; G01S 13/888
USPC ............................................... 342/21, 22, 27
See application file for complete search history.

(56) References Cited

U.S. PATENT DOCUMENTS

2011/0037712 A1\* 2/2011 Kim .................... H04M 1/7253
345/173
2014/0032034 A1\* 1/2014 Raptopoulos ........ G08G 5/0069
701/25

\* cited by examiner

*Primary Examiner* — Timothy A Brainard
(74) *Attorney, Agent, or Firm* — Haynes and Boone, LLP

(57) ABSTRACT

A system includes a self-propelled robotic vehicle carrying an UWB sensor. The UWB sensor responds to binary transitions of a mode control signal to select for its modes of operation.

13 Claims, 5 Drawing Sheets

ROBOTIC SENSE-THROUGH-WALL SENSOR WITH SIMPLIFIED CONTROL INTERFACE

CROSS REFERENCE TO RELATED APPLICATIONS

This application claims the benefit of U.S. Provisional Application No. 61/868,512, filed Aug. 21, 2013, the contents of which are incorporated by reference in their entirety.

BACKGROUND

The present disclosure generally relates to radio frequency (RF) detection and ranging (remote sensing) and, more particularly, to robotic surveillance systems capable of discriminating living individuals from inanimate objects. Mountable remote sensors on a robotic self-propelled frame or housing have a major importance to the law enforcement and military personnel compared to traditional hand held devices. Rapid deployment in hard-to-reach terrains and standoff sensing capability that keeps the operator out of harm's way are the major advantages of robot-mountable remote sensors.

A remote controlled robotic vehicle may be used to enter structures in which it would be dangerous for human operators. For example, a collapsed building from earthquake damage may be prone to further collapse such that it is unsafe for human entry. Should a building include armed or otherwise dangerous individuals, the desirability of determining where/whether there are such occupants using a remote controlled robotic sensor is obvious. To meet this need in the art, sensors that can detect the respiration and/or heartbeat of individuals hidden behind walls have been developed. Such sensors may be deemed as "sense-through-the-wall" due to this ability to detect targets hidden behind walls or rubble. For example, a sense-through-wall sensor such as disclosed in U.S. Pat. No. 8,779,966 may be mounted to a remote controlled robotic ground vehicle or flying vehicle. But a user may have already developed a custom control interface for controlling the robotic ground vehicle. It is very expensive and cumbersome to then re-program the control interface to add the capability of controlling a sense-through-wall sensor.

Accordingly, there is a need in the art for a simplified sensor interface that may take advantage our unused control signals in a pre-existing control interface for a robotic vehicle.

DETAILED DESCRIPTION

To provide the ability to detect movement, respiration, or heartbeat of individuals behind walls, a robotic sense-through-wall system is provided with an improved interface that enables control of the sense-through-wall sensor using as little as two signals. In that regard, the following discussion is directed to a wired interface between the remote sensor and the self-propelled robotic frame. But it will be appreciated that alternative embodiments may be developed using a wireless interface in which as little as two signals provide the desired control for the sense-through-wall remote sensor.

Figure 1:
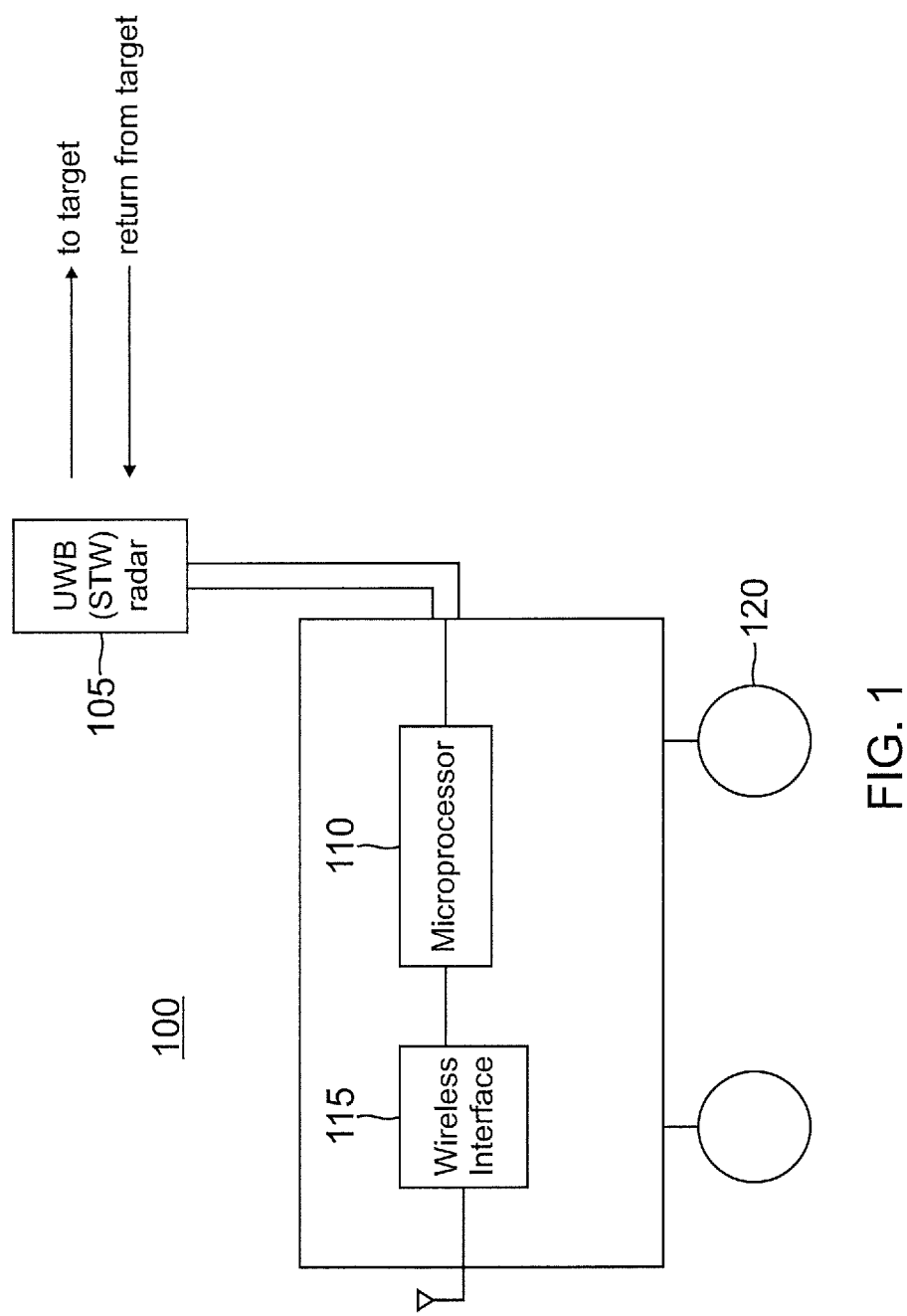
FIG. 1 is a block diagram of an example remote-controlled vehicle including a sense-through-wall sensor in accordance with an embodiment of the disclosure.

The self-propelled vehicle for transporting the sensor may be either a remote-controlled ground vehicle or a remote-controlled flying vehicle such a remote-controlled helicopter. Turning now to the drawings, FIG. 1 shows a block diagram of a self-propelled robotic vehicle 100 including an ultra-wideband (UWB) sensor configured to detect respiration, movement, and/or heartbeat of individuals behind walls. Vehicle 100 is remotely controlled by a user so as to approach buildings and detect individuals according. Such remote control may be implemented through either a wired or a wireless interface. Because wireless control is so convenient, the following discussion will be directed to wireless control although wired control may also be used.

Sensor 105 produces a sensor image of detected individuals using any suitable video format such as NTSC, PAL, or HD as controlled through its own microprocessor (discussed further below). To coordinate its remote control, vehicle 100 also includes a microprocessor 110 that receives the advantageous sensor control signals discussed further herein from a remote user through a wireless interface 115. Wireless interface 115 may utilize WiF, Bluetooth interface, or any other suitable wireless protocol. As illustrated, vehicle 100 is self-propelled using propulsion means 120 that may comprise wheels, tracks, or propellers.

Figure 2:
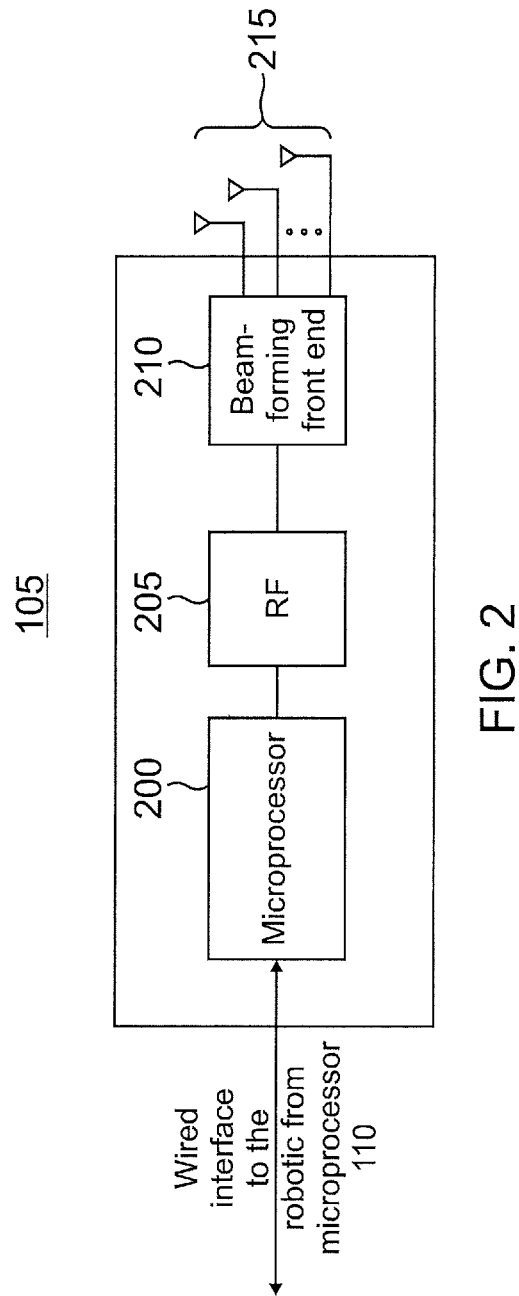
FIG. 2 is a block diagram for the sense-through-wall sensor of FIG. 1.

FIG. 2 illustrates a block diagram for UWB sensor 105. Since UWB sensor 105 is configured for sense-through-wall (STW) detection of living individuals, UWB sensor 105 may also be denoted as a STW sensor 105. STW sensor 105 includes a microprocessor 200, an RF and signal processing section 205, and a beam-forming frontend 210 that transmits and receives through an antenna array 215. RF section 205 includes a pulse generator that generates UWB pulses at a desired pulse repetition frequency (PRF) in the 1 to 10 GHz band. Although higher frequencies may be used, pulses in the 1 to 10 GHz bandwidth can readily penetrate soil, glass, wood, concrete, dry wall, and bricks with varying attenuation constants. Varying the PRF varies the surveillance range accordingly. For example, by choosing a PRF in the range of 10 to 100 MHz with the appropriate transmission power, the surveillance roundtrip range may be varied from approximately 5 to 50 feet.

RF section 205 also includes a digital signal processor (DSP) to perform the desired signal processing to identify reflected signals from a motion, breathing, or heartbeat of an individual hidden behind walls. For example, RF section 205 may generate Gaussian pulses as short as 10 picoseconds. Through digital signal processing, amplitude and delay information from the pulses reflected by individuals may be extracted and digitally processed. Additional details for the sensor system architectures and signal processing used to detect living individuals may be found in U.S. Pat. Nos. 8,368,586 and 8,779,966, the contents of which are incorporated herein in their entirety.

To enable an advantageous control of the sensor transmitting modes by STW sensor 105 using, for example, just a single binary control signal, microprocessor 200 is configured to control the operating mode of STW sensor 105. For example, the single binary control signal may be used to command STW sensor 105 to operate at discrete surveillance ranges such as through generating corresponding PRFs. The following discussion will assume that two surveillance ranges may be selected in this fashion but it will be appreciated that additional surveillance ranges may also be included. The transition between these operating modes is triggered by a binary transition of the single control signal. For example, the state transitions may be triggered by a rising edge of the binary control signal. However, the falling edge may also be used in alternative embodiments. The following discussion will thus generically refer to a binary transition of the control signal to trigger mode transitions. Referring again to FIG. 2, microprocessor 200 responds to the binary transitions to control the mode of operation for STW sensor 105. An example flow or state diagram for the resulting control will now be discussed.

Figure 3:
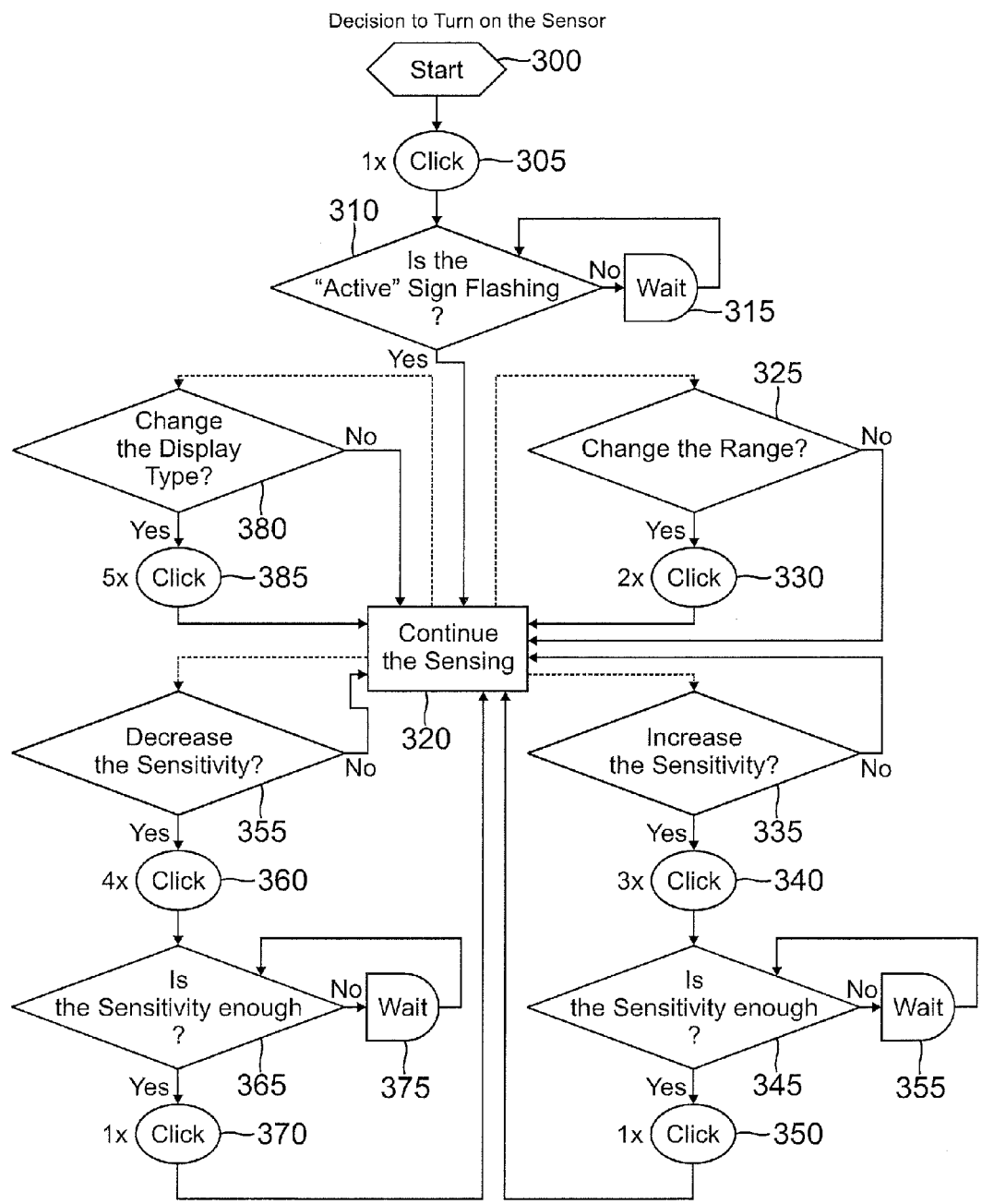
FIG. 3 is a flow chart for the control interface of the sense-through-wall sensor of FIG. 2.

An example state diagram is shown in FIG. 3. Upon power-up, STW sensor 105 is in the start state 300. A binary transition of the control signal (represented in Figure as 1×) or by a "click" state 305 puts the sensor into an active sensing state. The remote user's display (not illustrated) responds to the resulting sensor video stream from STW 105 by providing an indication such as a flashing "active" sign that is detected in a decision block 310. If there is no indication to the user of the active sensing state, the user waits as shown by state 315. With STW sensor 105 active, the user may control the robotic vehicle to scan through the building or structure of interest as shown by state 320.

Upon the initial entry into state 320, STW sensor 105 is configured to use a certain range such as, for example, detection from approximately zero feet to 45 feet. This range selection may be done by selection of a corresponding PRF or through appropriate signal processing. From state 320, the other modes of operation are selected through corresponding transitions ("clicks") of the control signal. For example, if the user desires to change the range as represented by "yes" in a decision block 325, the user transitions the control signal twice as shown by state 330. STW 105 sensor will then operate in state 320 at the new range. For example, the sensor may then be in a short-range mode such as operating to detect from approximately zero to 20 feet. If the user then transitions the control signal twice again, STW sensor 105 returns to the default (longer) range mode. It will be appreciated that multiple ranges may be selected for in this fashion.

Figure 4:
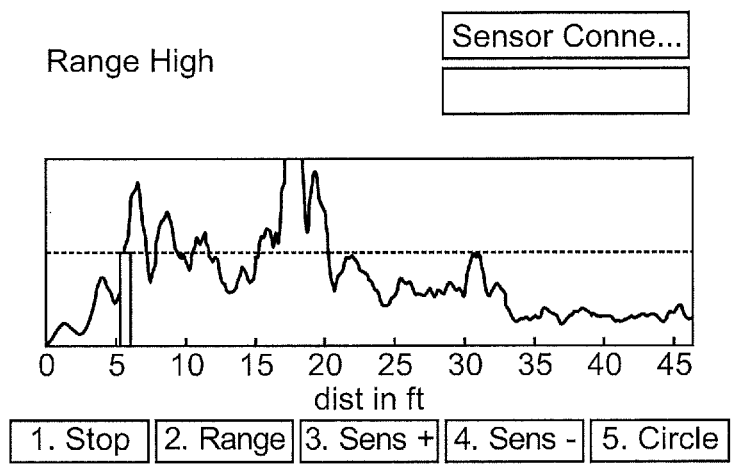
FIG. 4 is an example display of sensor video at the remote user's control interface.

An example display of the resulting sensor video for a maximum range of approximately 45 feet is shown in FIG. 4. The user is reminded in this display through "2. Range" that two transitions of the control signal changes the range setting. However, in addition to selecting the range of operation, the user may also desire to change the sensitivity (SNR) of STW 105 while operating in a desired range mode. Referring again to FIG. 3, a decision block 335 represents the yes/no decision by a user to increase the sensitivity. If the decision is yes, the user transitions the control signal 3 times as represented by state 340. In state 340, STW sensor 105 begins to increase its sensitivity at a constant rate. The user watches how the signal returns change. As the signal returns begin to saturate such as shown in FIG. 4, the user will find that the sensitivity is satisfactory in a decision block 345, whereupon the user transitions the control signal one time in a state 350 to return to state 320 (the sensitivity being maintained constant at the newly-increased level). Alternatively, the user may continue to wait in step 355 to allow the sensitivity to increase.

Through inspection of the display such as shown in FIG. 4, a user may determine that too much sensitivity is being used in a decision block 355. If so, the user may transition the control signal four times to enter state 360. In this state, STW sensor 105 continually reduces its sensitivity a certain amount each second. The user judges whether the sensitivity reduction is sufficient in a decision block 365. If the sensitivity decrease was sufficient, the user transitions the control signal one time in state 370 to again enter state 320, whereupon the sensitivity will be maintained constant at the newly-decreased level. However, if the sensitivity decrease was not deemed sufficient at step 365, the user continues to wait in a step 375 to allow the sensitivity to continue to decrease.

Figure 5:
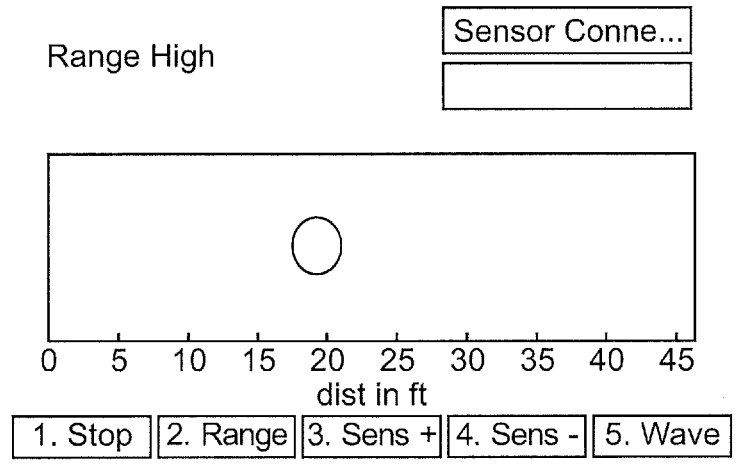
FIG. 5 is an example display of sensor video at the remote user's control interface.

The various sensor returns are displayed according to their strength in the normal display mode such as shown in FIG. 4. However, STW sensor 105 is also configured to calculate the sensor cross section of detected individuals. For example, STW sensor 105 may represent the sensor cross section by an appropriately-scaled circle at the corresponding range as shown in FIG. 5. A user decides whether to select for this alternative display mode in a decision block 380. If yes, the user transitions the control signal five times as shown in state 385. STW sensor 105 will then continue to operate in the new display mode. It will be appreciated that additional display modes may be selected by repeatedly cycling through state 385. For example, another display mode may be a histogram of the responses over time at the various ranges.

Figure 6:
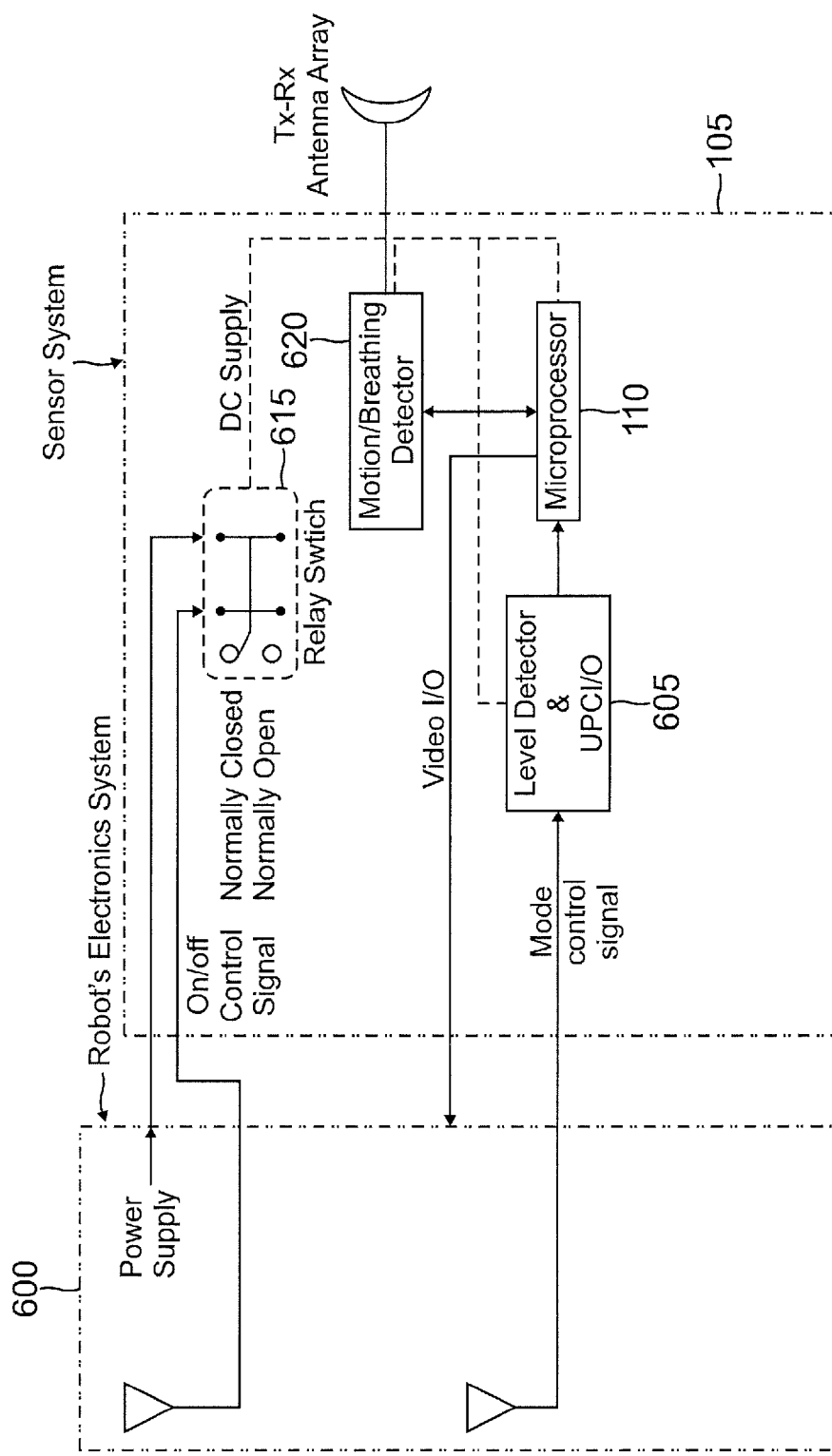
FIG. 6 is a block diagram of the mode control signal and on/off control signal interfacing between the robotic vehicle and the sense-through-wall sensor.

Those of ordinary skill will readily appreciate that the number of transitions shown in FIG. 3 to select for the various modes of operation is merely representative such that different numbers of transitions may be used in alternative embodiments. In addition, the same control signal transitioned in FIG. 3 could also be used to control a power on/power off of STW sensor 105. But it is more convenient in some embodiments to use a separate on/off control signal. For example, STW sensor 105 may include a power supply relay switch 616 as shown in FIG. 6. The remote-controlled vehicle is represented by its wireless interface 600 that receives the corresponding on/off and mode control signal commands from the remote user. STW sensor 105 includes a transition detection means for each control signal such as a level detector 605 illustrated in the mode control signal pathway. When the user transitions the on/off control signal, relay switch 616 closes to power up STW sensor 105. Similarly, a subsequent transition of the on/off control signal opens relay switch 615 to power down STW sensor 105. RF and signal processing section 205 and beam-forming frontend 210 discussed with regard to FIG. 2 are represented in FIG. 6 by a motion/breathing detection module 620.

Consider the advantages of the robotic STW sensor systems discussed herein: assorted remote-controlled vehicles have been developed that can either fly above or enter buildings. Many millions of dollars may have been spent developing such robotic systems. In such systems, a user will have some sort of remote control device that will include a display and either a keyboard or touch-screen interface. The interface will include custom software that allows the user to control the robotic vehicle. It is thus very costly and cumbersome to alter this pre-existing software to integrate control of STW sensor 105 discussed herein. But consider a typical keyboard: it will include assorted function buttons such the familiar F1 through F12 buttons that may be assigned to particular uses. To integrate with STW sensor 105, a remote control user interface need merely have just two such assignable buttons and corresponding signals. One button is assigned as the on/off control signal button. Similarly, another button is assigned as the mode control signal button. As shown in FIGS. 4 and 5, the resulting display on the remote control interface may be configured to remind the user of the number of mode control signal transitions used to transition into the different modes. In that regard, the "stop," "range," and so on buttons shown at the bottom of the displays of FIGS. 4 and 5 may be configured to be highlighted when selected for by the appropriate number of transitions of the mode control signal. In this fashion, STW sensor 105 may be readily integrated into a wide variety of flying and ground-propelled robotic vehicles.

Embodiments described herein illustrate but do not limit the disclosure. It should also be understood that numerous modifications and variations are possible in accordance with the principles of the present disclosure. Accordingly, the scope of the disclosure is best defined only by the following claims.

I claim:

1. A system comprising:
a self-propelled robotic vehicle comprising a wireless interface configured to receive a mode control signal wirelessly from a remote user; and
an UWB sensor configured to change operating modes responsive to successive binary transitions of the mode control signal, wherein the UWB sensor is configured to operate over a first range and over a second range shorter than the first range, and wherein the UWB sensor further comprises a microprocessor configured to control the UWB sensor to operate over the first range responsive to a single binary transition of the mode control signal and to operate over the second range responsive to two binary transitions of the mode control signal.

2. The system of claim 1, wherein the robotic vehicle is a ground vehicle.

3. The system of claim 1, wherein the robotic vehicle is a flying vehicle.

4. The system of claim 3, wherein the flying vehicle is a rotary or fixed wing asset.

5. The system of claim 1, wherein the wireless interface is further configured to receive an on/off control signal wirelessly from the remote user, and wherein the UWB sensor is powered through a relay switch controlled by the on/off control signal.

6. The system of claim 1, wherein the microprocessor is further configured to control the UWB sensor to continually increase its sensitivity responsive to a first number of binary transitions of the mode control signal.

7. The system of claim 6, wherein the microprocessor is further configured to control the UWB sensor to stop increasing its sensitivity responsive to a subsequent binary transition of the mode control signal after the first number of binary transitions.

8. The system of claim 1, wherein the microprocessor is further configured to control the UWB sensor to continually decrease its sensitivity responsive to a second number of binary transitions of the mode control signal.

9. The system of claim 8, wherein the microprocessor is further configured to control the UWB sensor to stop decreasing its sensitivity responsive to a subsequent binary transition of the mode control signal after the second number of binary transitions.

10. The system of claim 1, wherein the microprocessor is further configured to control a display mode for the system responsive to a second number of binary transitions of the mode control signal.

11. The system of claim 10, wherein the microprocessor is further configured to change the display mode for the system responsive to the second number of binary transitions of the mode control signal to select for a cross-section display mode.

12. A method of controlling an UWB sensor on a self-propelled vehicle, comprising:
receiving a mode control signal wirelessly via a wireless interface from a remote user;
controlling operation of the UWB sensor using a microprocessor to operate the UWB sensor over a range that includes a first range and a second range as options wherein the second range is shorter than the first range;
controlling operation of the UWB sensor using a microprocessor to operate the UWB sensor at one of a plurality of sensitivities;
operating the UWB sensor over the first range or over the second range;
operating the UWB sensor at a first sensitivity of the plurality of sensitivities;
changing the range for the UWB sensor responsive to a first number of binary transitions for a mode control signal; and
changing the sensitivity for the UWB sensor responsive to second number of binary transitions of the mode control signal.

13. The method of claim 12, further comprising:
changing a display mode for the UWB sensor to a cross-section display mode responsive to a third number of binary transitions of the mode control signal.

* * * * *